(12) United States Patent
Sun

(10) Patent No.: US 12,233,423 B2
(45) Date of Patent: Feb. 25, 2025

(54) GRINDING AND SHAPING METHOD USING VERTICAL GRINDING MILL

(71) Applicant: Xiamen ISO Standard Sand Co., Ltd., Fujian (CN)

(72) Inventor: Zhisheng Sun, Beijing (CN)

(73) Assignee: Xiamen ISO Standard Sand Co., Ltd.

( * ) Notice: Subject to any disclaimer, the term of this patent is extended or adjusted under 35 U.S.C. 154(b) by 367 days.

(21) Appl. No.: 17/433,988

(22) PCT Filed: Mar. 23, 2020

(86) PCT No.: PCT/CN2020/080719
§ 371 (c)(1),
(2) Date: Aug. 25, 2021

(87) PCT Pub. No.: WO2021/142930
PCT Pub. Date: Jul. 22, 2021

(65) Prior Publication Data
US 2022/0134347 A1    May 5, 2022

(30) Foreign Application Priority Data
Jan. 15, 2020   (CN) .......................... 202010043324.9

(51) Int. Cl.
| | |
|---|---|
| B02C 17/16 | (2006.01) |
| B02C 17/04 | (2006.01) |
| B02C 17/20 | (2006.01) |
| B02C 23/26 | (2006.01) |
| B02C 25/00 | (2006.01) |

(52) U.S. Cl.
CPC ............ *B02C 17/163* (2013.01); *B02C 17/04* (2013.01); *B02C 17/205* (2013.01); *B02C 23/26* (2013.01); *B02C 25/00* (2013.01)

(58) Field of Classification Search
CPC ......... B02C 17/10; B02C 17/16; B02C 17/18; B02C 17/1805; B02C 17/183; B02C 17/1875; B02C 17/22; B02C 25/00
See application file for complete search history.

(56) References Cited

U.S. PATENT DOCUMENTS 3,533,566 A * 10/1970 MacQuat ................ B02C 17/16
                                                        241/179
3,770,214 A * 11/1973 Gabor .................... B02C 17/16
                                                        241/43

(Continued)

*Primary Examiner* — Debra M Sullivan
*Assistant Examiner* — Matthew Stephens
(74) *Attorney, Agent, or Firm* — Jose Cherson Weissbrot

(57) ABSTRACT

The present invention provides a grinding and shaping method using a vertical grinding mill. The grinding and shaping method comprises selecting a vertical grinding mill with thread pitch/diameter ratio of a spiral rotor; selecting the grade of a grinding medium and determining a filling factor and adding the grinding medium into a grinding chamber of the vertical grinding mill; sequentially initiating a dust collector, an air blowing device, a driving device and a feeding device; adjusting rotation speed of the spiral rotor; feeding a raw material into the feeding port at an upper end of the grinding chamber; initiating a discharging device, and discharging the raw material from a discharging port; wherein when selecting the vertical grinding mill, the thread pitch/diameter ratio of the spiral rotor is determined according to the Mohs hardness of the raw material.

9 Claims, 2 Drawing Sheets

(56) References Cited

U.S. PATENT DOCUMENTS

| | | | | |
|---|---|---|---|---|
| 4,754,934 A | * | 7/1988 | Ikebuchi | B02C 17/16 |
| | | | | 241/171 |
| 5,957,398 A | * | 9/1999 | Ogata | B02C 17/163 |
| | | | | 241/179 |
| 7,971,808 B2 | * | 7/2011 | Gerl | B02C 17/188 |
| | | | | 241/19 |
| 2015/0033912 A1 | * | 2/2015 | Dial | C22C 32/001 |
| | | | | 75/352 |
| 2015/0375235 A1 | * | 12/2015 | Roitto | B02C 17/002 |
| | | | | 241/15 |
| 2021/0339315 A1 | * | 11/2021 | Matsunaga | B02C 17/16 |
| | | | | 241/19 |

* cited by examiner

GRINDING AND SHAPING METHOD USING VERTICAL GRINDING MILL

TECHNICAL FIELD

This invention generally relates to the technical field of vertical grinding mills, and more particularly, to a grinding and shaping method using a vertical grinding mill.

BACKGROUND

An industrial grinding mill is a type of n equipment widely used in the fields of mining, electric power, steel, cement and ceramics, etc. It is a cumbersome, large and energy-intensive equipment. Industrial tube mills have not been improved substantially since FLSmidth (Denmark) developed a tube mill for cement industry in 1882. The efficiency of conventional industrial tube mills is extraordinarily low. Its energy utilization rate is merely 2-3% because more than 95% of the consumed electric energy is converted into waste heat and noise.

Presently, the conventional equipment for grinding cement and other dry powders, such as a roll squeezer (roll-type vertical mill) combined with a tube mill or a roll-type vertical milling system, has shortcomings including high investment, low operation rate, high operation cost, high power consumption, high noise, heavy metal pollution and poor particle morphology (e.g., degree of sphericity and length-diameter ratio) of ground cement products, which severely affect the operating performance, degree of density and durability of the finished concrete products, resulting in a worldwide technical problem.

Therefore, to achieve an advanced eco-friendly technology with low energy consumption, high operation rate, low noise, low operation cost, high product quality (particle morphology) and low investment, novel grinding and shaping equipment (a vertical grinding mill) is urgently needed.

To solve the technical problems in the prior art, the present invention provides a grinding and shaping method using a vertical grinding mill.

SUMMARY

The purpose of the present invention is to provide a grinding and shaping method using a vertical grinding mill, used for grinding and shaping a powder or a granular material, sequentially comprising: selecting a vertical grinding mill, adding a grinding medium, initiating the vertical grinding mill, adjusting parameters, feeding a raw material, grinding and discharging.

More specifically, the grinding and shaping method using a vertical grinding mill of the present invention, comprising the steps of:

Selecting a vertical grinding mill: selecting a vertical grinding mill with suitable thread pitch/diameter ratio of the spiral rotor according to the raw material to be ground;

Adding a grinding medium: selecting the grade of a grinding medium and determining the filling factor according to the requirements of the particle sizes of the raw material and the ground product, and then adding the grinding medium into the grinding chamber of the vertical grinding mill;

Initiating the vertical grinding mill: sequentially initiating a dust collector, an air blowing device, a driving device and a feeding device, wherein the driving device propels the spiral rotor to rotate, and the air blowing device blows upward from the bottom of the grinding chamber;

Adjusting parameters: adjusting the rotation speed of the spiral rotor of the vertical grinding mill to change the cycling speed of the raw material and the grinding medium in the grinding chamber, thereby changing the flow rate of the raw material in the grinding chamber;

Feeding and grinding: feeding a raw material from the feeding port at the upper end of the grinding chamber and then grinding;

Discharging: initiating a discharging device, and discharging the material from the discharging port at the lower end of the grinding chamber.

In another embodiment of the present invention, when selecting a vertical grinding mill, the thread pitch/diameter ratio of the spiral rotor is determined according to the Mohs hardness of the raw material, and when the Mohs hardness of the raw material increases gradually, the thread pitch/diameter ratio of the spiral rotor of the vertical grinding mill decreases gradually.

In another embodiment of the present invention, the Mohs hardness of the raw material ranges from 1-6, and the thread pitch/diameter ratio of the spiral rotor of the vertical grinding mill ranges from 0.70-1.2.

In another embodiment of the present invention, through adjusting the rotation speed of the spiral rotor of the vertical grinding mill, the energy obtained by the grinding medium is matched with the energy required for grinding the raw material, which significantly improves the grinding and shaping effects, wherein the linear speed of the spiral rotor of the vertical grinding mill is 0.5~20 m/s, the critical linear speed of the spiral rotor of the vertical grinding mill is $v_c=10\sqrt{R}$ m/s, and the working linear speed is $v_w=(0.2~0.95)\,v_c$, wherein R represents the radius of the inner wall of the grinding chamber.

In another embodiment of the present invention, the deduction of the critical linear speed Vc is as follows: the critical linear speed is a speed obtained under the condition that, when the grinding balls rotate on the inner wall of the grinding mill, the friction force generated by the centrifugal force is equal to the gravity borne by the grinding balls, and the grinding balls stop cycling up and down, wherein $$\text{the centrifugal force } F = mv_c^2/R$$
$$\mu F = mg$$
$$\mu m v_c^2 / R = mg$$
$$v_c = \sqrt{gR/\mu} = 10\sqrt{R},$$

wherein F represents the centrifugal force (N), m represents the mass of the grinding ball (kg), g represents the acceleration of gravity (m/s$^2$), wherein 10 m/s$^2$ is taken as the value of g for simplifying the calculation, u represents the friction coefficient of the grinding body, which is normally 0.1, and R represents the radius of the inner wall of the grinding chamber (m).

In another embodiment of the present invention, the maximum ball diameter of the grinding medium is $$\phi = (5~15) \times \sqrt[3]{d_{max}},$$

wherein $d_{max}$ is the maximum particle size of the raw material, and the minimum ball diameter of the grinding medium is determined according to the requirement of the fineness of ground product, wherein the smaller the particle size is, the smaller the minimum ball diameter is, wherein the maximum ball diameter is ϕ 6 mm~ϕ 18 mm.

In another embodiment of the present invention, the filling coefficient of the grinding medium ranges from 30%-70%.

In another embodiment of the present invention, the inner wall of the grinding chamber is provided with an arc-surface lining plate, the thickness of the arc-surface lining plate is 50-100 mm, and the lining plate is made of a wear-resistant corundum material, wherein the spiral rotor is provided with a spiral lining plate, and the spiral lining plate is also made of a wear-resistant corundum material.

In another embodiment of the present invention, the air pressure generated by the air blowing device in the grinding chamber ranges from 0-0.1 MPa.

In another embodiment of the present invention, the amount of the raw material entering the grinding chamber is metered by using the feeding device.

In another embodiment of the present invention, a flow valve is arranged on the discharging device for controlling the discharging amount.

Taking grinding and shaping the cement as an example, the method of the present invention has the following advantages:

1. A dry powder (clinker powder) with a median particle diameter $D_{50}$ of 30-40 μm is ground into a powder with a median particle size of 15 μm or less, and the particle morphology (length-diameter ratio and circularity) is greatly improved.
2. The investment of a cement-grinding workshop is reduced by 30-50%, the duration of construction, installation and commissioning is shortened by about 50%, and the area of a newly-built workshop is reduced to about 50% of what it used to be.
3. The operation cost is reduced by 50%, the operation rate reaches 95%, the abrasion of the grinding medium is reduced by ⅔, no sliding bearings are needed, and the consumption of the lubricant (grease) and cooling water is reduced.
4. The reduction of energy consumption and noise during the grinding process is realized. The power consumption is reduced by 8-10 kWh/t, and the emission of $CO_2$ is reduced. The noise generated is lower than 75 decibels, which effectively improves the operating environment.
5. The construction of a mobile modularized cement grinding station is realized.
6. Environment-friendly cement products meeting the standard of heavy metal content are achieved, reducing the environmental pollution and avoiding body injuries.

Taking grinding and shaping the machine-made sand as an example, the method of the present invention has the following advantages:

1. After being ground and shaped, the morphology (length-diameter ratio and circularity) of the machine-made sand particles is greatly improved, wherein the length-diameter ratio is reduced by more than 10%, and the circularity is increased by more than 5%.
2. After being ground and shaped, the mortar fluidity of the machine-made sand is increased by more than 8%.
3. After being ground and shaped, the working performance of the concrete prepared by using machine-made sand is greatly improved, the density is greatly enhanced, and the functional life is prolonged.
4. After being ground and shaped, the strength and stability of the concrete prepared by using machine-made sand are greatly improved.

BRIEF DESCRIPTION OF THE DRAWINGS

The drawings described herein are used to facilitate a further understanding of the present invention while forming a part of the present invention. The embodiments of the present invention and the description thereof are used to explain the present invention but not form an improper limitation of the present invention.

DETAILED DESCRIPTION

To illustrate the technical problems to be solved by the present invention as well as the technical solutions and benefits of the present invention, drawings and detailed embodiments are combined hereinafter to further elaborate the techniques of the present invention. It should be understood that the embodiments described herein are merely used to explain but not to limit the present invention.

Figure 1:
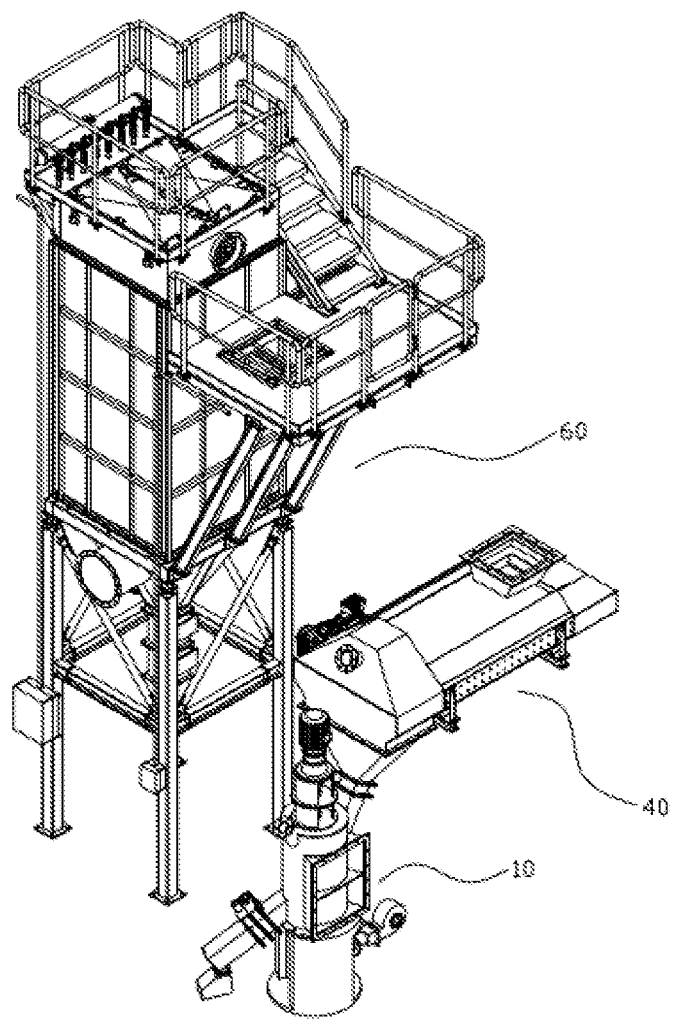
FIG. 1 is a conceptual diagram illustrating an exemplary structure of the present invention.
Figure 2:
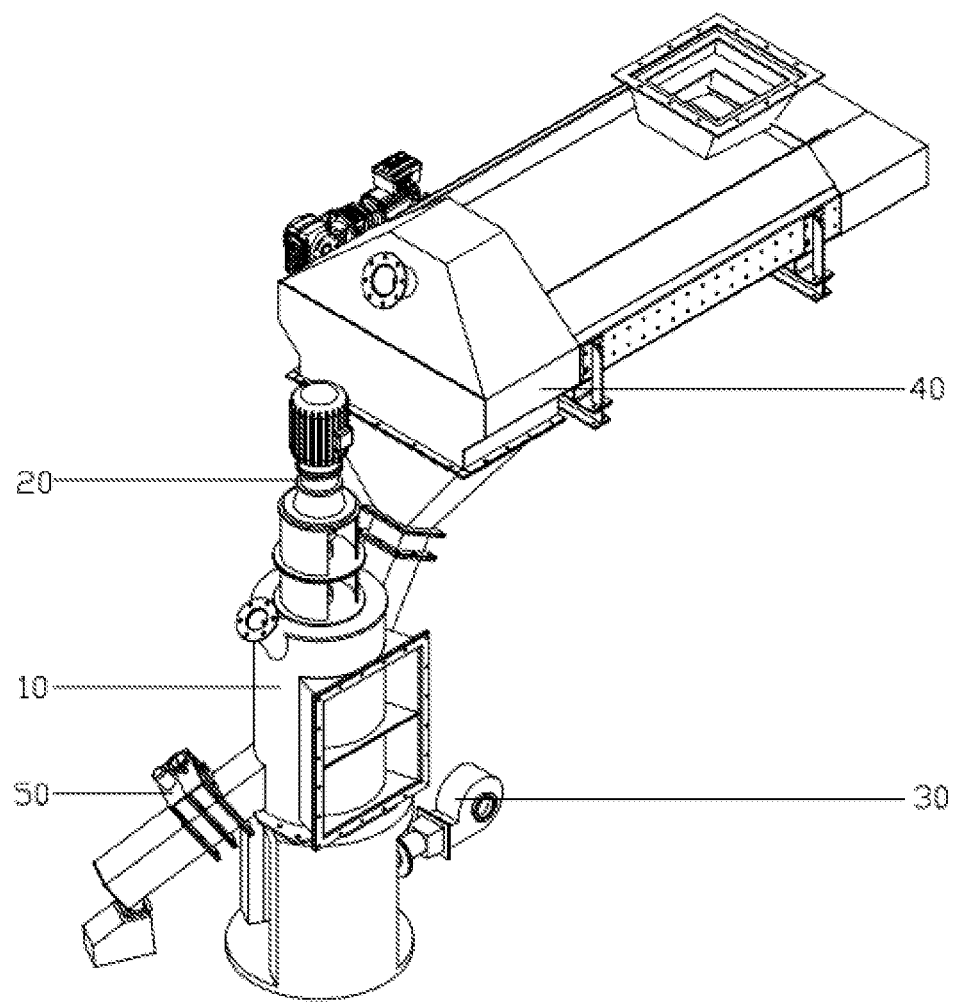
FIG. 2 is a conceptual diagram illustrating a partial structure of the present invention. Marking Instructions of the Drawings: 10—Vertical Grinding Mill, 20—Driving Device, 30—Air Blowing Device, 40—Feeding Device, 50—Discharging Device, 60—Dust Collector.

The present invention provides a grinding and shaping method using a vertical grinding mill. The method of the present invention primarily adopts a system shown in FIGS. 1-2. The system comprises a grinding chamber, a driving device, an air blowing device, a feeding device, a discharging device and a dust collector. The driving device is fixedly arranged above the grinding chamber, the feeding device is connected with a feeding port at the upper end of the grinding chamber, and the discharging device is connected with a discharging port at the lower end of the grinding chamber. The grinding and shaping method using a vertical grinding mill of the present invention sequentially comprises the following steps: selecting a vertical grinding mill, adding a grinding medium, initiating the vertical grinding mill, adjusting parameters, feeding a raw material, grinding and discharging.

More specifically, the grinding and shaping method using a vertical grinding mill of the present invention, comprising the steps of:

Selecting a vertical grinding mill: selecting a vertical grinding mill with suitable thread pitch/diameter ratio of the spiral rotor according to the raw material to be ground; the thread pitch/diameter ratio of the spiral rotor is selected according to the Mohs hardness of the raw material; when the Mohs hardness of the raw material increases gradually, the thread pitch/diameter ratio of the spiral rotor of the vertical grinding mill decreases gradually; specifically, when the Mohs hardness of the raw material is low, the thread pitch/diameter ratio of the spiral rotor of the vertical grinding mill is large, and when the Mohs hardness of the raw material is high, the thread pitch/diameter ratio of the spiral rotor of the vertical grinding mill is small; preferably, the Mohs hardness of the raw material ranges from 1-6, and the thread pitch/diameter ratio of the spiral rotor of the vertical grinding mill ranges from 0.70-1.2;

Adding a grinding medium: selecting the grade of a grinding medium and determining the filling factor according to the requirements of the particle sizes of the raw material and the finished product, and then adding the grinding medium into the grinding chamber of the vertical grinding mill; the inner wall of the grinding chamber is provided with an arc-surface lining plate, the thickness of the arc-surface lining plate is 50-100 mm, and the lining plate is made of a wear-resistant corundum material; the spiral rotor is provided with a spiral lining plate, and the spiral lining plate is also made of a wear-resistant corundum material;

Initiating the vertical grinding mill: sequentially initiating the dust collector, the air blowing device, the driving device and the feeding device; the driving device propels the spiral rotor to rotate, and the air blowing device blows upward from the bottom of the grinding chamber; the air blowing device is primarily used for facilitating the ventilation in the grinding chamber, improving the dispersity of raw material particles and achieving the smoothness of discharge; specifically, the air pressure in the grinding chamber ranges from 0-0.1 MPa; through adjusting the air amount blown into the grinding chamber according to the internal temperature of the vertical grinding mill and the flowing-out condition of the raw material, the internal temperature of the vertical grinding mill is controlled lower than 120° C., and the gypsum is protected from being dehydrated during the grinding process of the cement;

Adjusting parameters: adjusting the rotation speed of the spiral rotor of the vertical grinding mill to change the cycling speed of the raw material and the grinding medium in the grinding chamber, thereby changing the flow rate of the raw material in the grinding chamber;

Feeding a raw material: feeding a raw material from the feeding port at the upper end of the grinding chamber, grinding, and metering the amount of the raw material entering the grinding chamber through the feeding device;

Discharging: initiating a discharging device, and discharging the material from the discharging port at the lower end of the grinding chamber; the discharging device is equipped with a flow valve for controlling the discharging amount, wherein the balance of the discharging amount and the feeding amount is controlled by the feedback signals of the flow valve and the metering scale such that the fineness of the ground product is further controlled.

Through adjusting the rotation speed of the spiral rotor of the vertical grinding mill, the energy obtained by the grinding medium is matched with the energy required for grinding the raw material, so that the grinding and shaping effects are significantly improved. The linear speed of the spiral rotor of the vertical grinding mill is 0.5~20 m/s, the critical linear speed of the spiral rotor of the vertical grinding mill is $v_c=10\sqrt{R}$ m/s, and the working linear speed is $v_w=(0.2~0.95) v_c$, wherein R represents the radius of the inner wall of the grinding chamber.

Furthermore, the deduction of the critical linear speed Vc is as follows:

The critical linear speed is a speed obtained under the condition that, when the grinding balls rotate on the inner wall of the grinding mill, the friction force generated by the centrifugal force is equal to the gravity borne by the grinding balls, and the grinding balls stop cycling up and down, wherein $$\text{the centrifugal force } F = mv_c^2/R$$
$$\mu F = mg$$
$$\mu m v_c^2/R = mg$$
$$v_c = \sqrt{gR/\mu} = 10\sqrt{R},$$

wherein F represents the centrifugal force (N), m represents the mass of the grinding ball (kg), g represents the acceleration of gravity (m/s$^2$), wherein 10 m/s$^2$ is taken as the value of g for simplifying the calculation, µ represents the friction coefficient of the grinding body, which is normally 0.1, and R represents the radius of the inner wall of the grinding chamber (m).

The filling coefficient of the grinding medium ranges from 30%-70%. The maximum ball diameter of the grinding medium is $$\phi = (5~15) \times \sqrt[3]{d_{max}},$$

wherein $d_{max}$ is the maximum particle size of the raw material, and the minimum ball diameter of the grinding medium is determined by the required fineness of the ground product. The smaller the particle size is, the smaller the minimum ball diameter is, wherein the maximum ball diameter is $\phi$ 6 mm~$\phi$ 18 mm.

When the filling coefficient of the grinding medium is decreased, the linear speed (rotation speed) of the spiral rotor of the vertical grinding mill is increased properly.

When the filling coefficient of the grinding medium is decreased, the positive pressure in the grinding chamber is decreased and the frictional frequency between grinding medium and the raw material is decreased. By increasing the linear speed (rotation speed) of the spiral rotor of the vertical grinding mill, the grinding energy obtained by the grinding medium is increased and the frictional frequency of spiral lining plate is increased such that the grinding ability is significantly improved.

When the filling coefficient of the grinding medium is increased, the linear speed (rotation speed) of the spiral rotor of the vertical grinding mill is decreased properly.

When the filling coefficient of the grinding medium is increased, the positive pressure in the grinding chamber is increased and the frictional frequency between grinding medium and the raw material is increased. By decreasing the linear speed (rotation speed) of the spiral rotor of the vertical grinding mill, the grinding energy of the grinding medium is reduced, the frictional frequency of the spiral lining plate of the spiral rotor is decreased, and the total grinding capacity is kept unchanged.

The vertical grinding mill of the present invention adopts a spherical grinding medium. According to the Mohs hardness of the raw material, the particle size of the raw material and the required particle size of the product, the grading of the grinding medium is optimized, and the linear speed (rotation speed) of the spiral rotor of the vertical grinding mill is regulated according to the energy required by the grinding and shaping of the raw material. In this way, the energy required for grinding and shaping can be accurately designed. According to the method of the present invention, when the vertical grinding mill starts operating, the driving device propels the spiral rotor to rotate at a low speed and causes an ordered cyclic motion between the grinding medium and the raw material. The raw material and the grinding medium are arranged on the upper surface of the spiral lining plate and spiral upward along the spiral plane whiling performing a radial centrifugal motion. Meanwhile, the raw material and the grinding medium spiral downward between the inner wall of the grinding chamber and the spiral lining plate. The speed difference between the raw material particles and the grinding medium is caused by the uneven force. Therefore, a part of the raw material particles is strongly squeezed, pressed and sheared, and the other part of the raw material particles rub against each other, so that efficient grinding of the raw material is achieved. The spiral rotor acts on the grinding medium and the raw material with full energy, thereby achieving the best grinding effect. The benefits of the present invention mainly comprise the following aspects:

First, a whole process of grinding and shaping is achieved: when the spiral rotor rotates with the spiral lining plate, a part of the grinding medium and raw material rise through the rubbing action, and the energy enters the raw material while entering the grinding medium. A part of the grinding medium and the raw material is squeezed, pressed, sheared and ground, and the other part of the grinding medium and the raw material are in the descending process between the spiral rotor and the inner wall of the grinding chamber under the action of the gravity and the centrifugal force, resulting in a mixed motion of gravity impact and rolling.

Second, the ball diameter of the grinding medium is more reasonably matched with the particle size of the raw material. Due to the centrifugal force generated by the rotation of the spiral rotor, the grinding medium and the raw material particles are sequentially distributed from the center of the spiral rotor to the edge of the grinding chamber. A small ball diameter is matched with a small particle size, and a large ball diameter is matched with a large particle size. Thus, the grinding energy efficiency ratio becomes higher, which greatly facilitates the grinding process of the raw material with a large particle size.

Third, a positive pressure friction is achieved: the structure and operating mode of the vertical grinding mill determines that its main grinding mode is friction. Meanwhile, the grinding medium and the raw material in the vertical grinding mill provide strong positive stress for friction such that the grinding effect is effectively improved.

EMBODIMENTS

In embodiments 1-6, a φ600 vertical grinding mill is used to respectively grind and shape the cement clinker powder, the fly ash and the machine-made sand. The cement clinker powder is a powder (P·O42.5 cement with a median particle diameter $D_{50}$ of 33.4 μm) which is processed by using a roller press machine and is going to be fed into a ball mill. The fly ash is grade II ash with a median particle size $D_{50}$ of 17.8 μm generated by a power plant, and the machine-made sand is quartz sand with a particle size ranging from 0.1 to 5 mm. More specifically, the properties of the cement product obtained after the grinding and shaping processes (compared with the contrast cement) is shown in Table 1.

TABLE 1

Comparison of Properties between Ground and Shaped Cement Product and Contrast Cement

| | | Project | | | | | | | |
|---|---|---|---|---|---|---|---|---|---|
| | | Length-diameter Ratio | | | Circularity | | | 45 μm Sieving Residue | Median Particle Diameter | Water Consumption for Standard Consistency |
| Embodiment | | Max. | Min. | Average | Max. | Min. | Average | (%) | $D_{50}$ (μm) | (%) |
| Embodiment 1 | Ground and Shaped Cement | 3.174 | 1.037 | 1.685 | 0.902 | 0.487 | 0.748 | 9.0 | 12.619 | 24.0 |
| Embodiment 2 | | 2.748 | 1.085 | 1.620 | 0.857 | 0.578 | 0.719 | 8.7 | 11.247 | 25.0 |
| Contrast Cement | | 4.181 | 1.332 | 2.065 | 0.835 | 0.414 | 0.670 | 2.0 | 12.619 | 28.2 |

Notes:
The contrast cement is a finished cement product produced by a cement plaint by using a tube mill.

It can be seen from Table 1 that, the particle morphology (length-diameter ratio and circularity) of the cement product ground and shaped by using a vertical grinding mill is significantly improved, and the water consumption of standard consistency is reduced, so that the working performance of the concrete is enhanced and the function life of the concrete is prolonged.

TABLE 2

Comparison of Properties between Ground and Shaped Fly ash Product and Grade II Ash

| Embodiment | | Length-diameter Ratio | | | Circularity | | | 45 μm Sieving Residue (%) | Median Particle Diameter $D_{50}$ (μm) | Water Consumption for Standard Consistency (%) | Strength Activity Index (%) |
|---|---|---|---|---|---|---|---|---|---|---|---|
| | | Max. | Min. | Average | Max. | Min. | Average | | | | |
| Embodiment 3 | Ground and Shaped Fly Ash | 2.386 | 1.062 | 1.308 | 0.944 | 0.569 | 0.819 | 7.096 | 0.9 | 95 | 85 |
| Embodiment 4 | | 1.741 | 1.025 | 1.305 | 0.925 | 0.691 | 0.832 | 10.024 | 0.9 | 93 | 88 |
| Grade II Ash | | 1.921 | 1.095 | 1.343 | 0.914 | 0.612 | 0.817 | 17.825 | 21.8 | 96 | 80 |

It can be seen from Table 2 that, the particle morphology (length-diameter ratio and circularity) of the fly ash ground and shaped by using a vertical grinding mill is greatly improved, the fineness (median particle diameter and 45 μm sieving residue) is significantly improved, the water demand is reduced, the activity index is increased, the performance of fly ash product is greatly improved, and the application prospect in cement concrete industry is bright.

TABLE 3

Comparison of Properties between Ground and Shaped Machine-made Sand Product and Crude Sand

| Embodiment | | Length-diameter Ratio | | | Circularity | | | Mortar Fluidity (mm) |
|---|---|---|---|---|---|---|---|---|
| | | Max. | Min. | Average | Max. | Min. | Average | |
| Embodiment 5 | Ground and Shaped Machine-made Sand | 5.235 | 1.015 | 1.355 | 0.984 | 0.459 | 0.901 | 204 |
| Embodiment 6 | | 5.148 | 1.024 | 1.348 | 0.988 | 0.446 | 0.905 | 205 |
| Crude Sand | | 6.980 | 1.091 | 1.505 | 0.972 | 0.416 | 0.843 | 180 |

It can be seen from Table 3 that, the particle morphology (length-diameter ratio and circularity) of the crude sand ground and shaped by using a vertical grinding mill is greatly improved, and the mortar fluidity is significantly improved, which can effectively improve the working performance of cement concrete and prolong the functional life of concrete.

In conclusion, taking grinding and shaping the cement as an example, the method of the present invention has the following advantages:
1. A dry powder (clinker powder) with a median particle diameter $D_{50}$ of 30-40 μm is ground into a powder with a median particle size of 15 μm or less, and the particle morphology (length-diameter ratio and circularity) is greatly improved.
2. The investment of a cement-grinding workshop is reduced by 30-50%, the duration of construction, installation and commissioning is shortened by about 50%, and the area of a newly-built workshop is reduced to about 50% of what it used to be.
3. The operation cost is reduced by 50%, the operation rate reaches 95%, the abrasion of the grinding medium is reduced by ⅔, no sliding bearings are needed, and the consumption of the lubricant (grease) and cooling water is reduced.
4. The reduction of energy consumption and noise during the grinding process is realized. The power consumption is reduced by 8-10 kWh/t, and the emission of $CO_2$ is reduced. The noise generated is lower than 75 decibels, which effectively improves the operating environment.
5. The construction of a mobile modularized cement grinding station is realized.
6. Environment-friendly cement products meeting the standard of heavy metal content are achieved, reducing the environmental pollution and avoiding body injuries.

Taking grinding and shaping the machine-made sand as an example, the method of the present invention has the following advantages:
1. After being ground and shaped, the morphology (length-diameter ratio and circularity) of the machine-made sand particles is greatly improved, wherein the length-diameter ratio is reduced by more than 10%, and the circularity is increased by more than 5%.
2. After being ground and shaped, the mortar fluidity of the machine-made sand is increased by more than 8%.
3. After being ground and shaped, the working performance of the concrete prepared by using machine-made sand is greatly improved, the density is greatly enhanced, and the functional life is prolonged.
4. After being ground and shaped, the strength and stability of the concrete prepared by using machine-made sand are greatly improved.

The aforesaid is an exemplary description combined with drawings. It is obvious that the specific implementation of the present invention is not limited by the aforesaid methods. Any non-substantial improvements made by adopting the methods, concepts and technical solutions of the present invention, and the direct application of the concepts or technical solutions of the present invention in other occasions without improvement, shall fall into the scope defined by the claims of the present invention.

What is claimed is:

1. A grinding and shaping method using a vertical grinding mill configured to grind and shape a powder or a granular material, comprising:

selecting a vertical grinding mill with thread pitch/diameter ratio of a spiral rotor according to a raw material to be ground;

selecting the grade of a grinding medium and determining a filling factor according to requirements of particle sizes of the raw material and ground product, and adding the grinding medium into a grinding chamber of the vertical grinding mill;

sequentially initiating a dust collector, an air blowing device, a driving device and a feeding device of the vertical grinding mill, wherein the driving device propels the spiral rotor to rotate, and the air blowing device blows upward from bottom of the grinding chamber;

adjusting rotation speed of the spiral rotor of the vertical grinding mill to change cycling speed of the raw material and the grinding medium in the grinding chamber, thereby changing flow rate of the raw material in the grinding chamber;

feeding the raw material into the feeding port at an upper end of the grinding chamber and then grinding the raw material;

initiating a discharging device, and discharging the raw material from a discharging port at the lower end of the grinding chamber;

wherein when selecting the vertical grinding mill, the thread pitch/diameter ratio of the spiral rotor is determined according to the Mohs hardness of the raw material; wherein when the Mohs hardness of the raw material increases, the thread pitch/diameter ratio of the spiral rotor of the vertical grinding mill decreases.

2. The grinding and shaping method using a vertical grinding mill of claim 1, wherein the Mohs hardness of the raw material ranges from 1-6, and the thread pitch/diameter ratio of the spiral rotor of the vertical grinding mill ranges from 0.70-1.2.

3. The grinding and shaping method using a vertical grinding mill of claim 1, wherein through adjusting the rotation speed of the spiral rotor of the vertical grinding mill, the energy obtained by the grinding medium is matched with the energy required for grinding the raw material, wherein linear speed of the spiral rotor of the vertical grinding mill is 0.5~20 m/s, wherein critical linear speed of the spiral rotor of the vertical grinding mill is $v_c=10\sqrt{R}$ m/s, and wherein working linear speed is $v_w=(0.2~0.95) v_c$, wherein R represents the radius of inner wall of the grinding chamber.

4. The grinding and shaping method using a vertical grinding mill of claim 1, wherein maximum ball diameter of the grinding medium is $$\phi = (5\sim 15) \times \sqrt[3]{d_{max}},$$

wherein $d_{max}$ is maximum particle size of the raw material, and wherein minimum ball diameter of the grinding medium is determined according to the requirement of the fineness of ground product, wherein the smaller the particle size is, the smaller the minimum ball diameter is, wherein maximum ball diameter is $\phi$ 6 mm~$\phi$ 18 mm.

5. The grinding and shaping method using a vertical grinding mill of claim 1, wherein the filling coefficient of the grinding medium ranges from 30%-70%.

6. The grinding and shaping method using a vertical grinding mill of claim 1, wherein the inner wall of the grinding chamber is provided with an arc-surface lining plate, wherein the thickness of the arc-surface lining plate is 50-100 mm, and wherein the lining plate is made of a wear-resistant corundum material, wherein the spiral rotor is provided with a spiral lining plate, and wherein the spiral lining plate is made of a wear-resistant corundum material.

7. The grinding and shaping method using a vertical grinding mill of claim 1, wherein air pressure generated by the air blowing device in the grinding chamber ranges from 0-0.1 MPa.

8. The grinding and shaping method using a vertical grinding mill of claim 1, wherein the amount of the raw material entering the grinding chamber is measured by using the feeding device.

9. The grinding and shaping method using a vertical grinding mill of claim 1, wherein a flow valve is arranged on the discharging device for controlling the discharging amount.

* * * * *